United States Patent Office 3,546,797
Patented Dec. 15, 1970

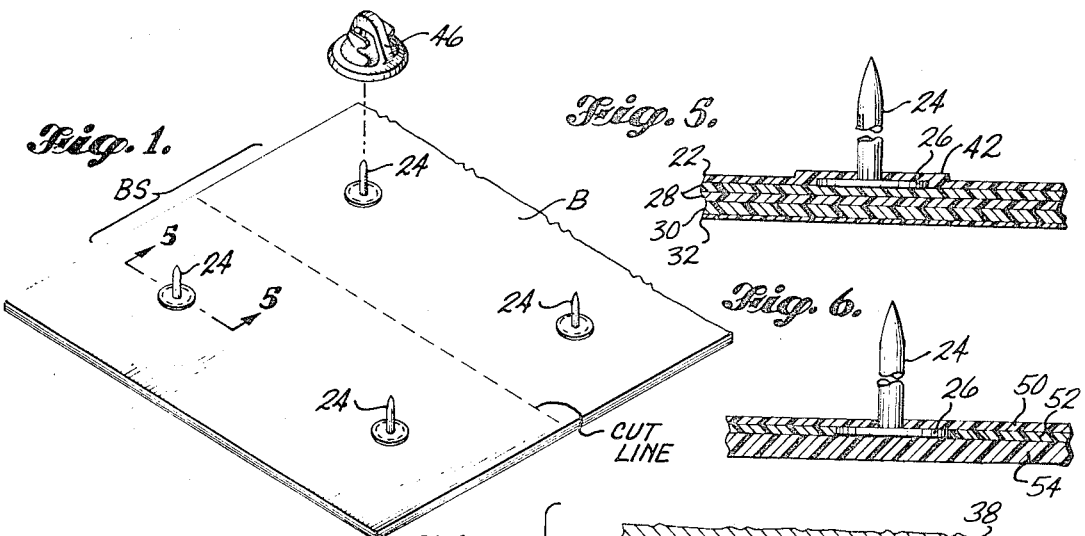
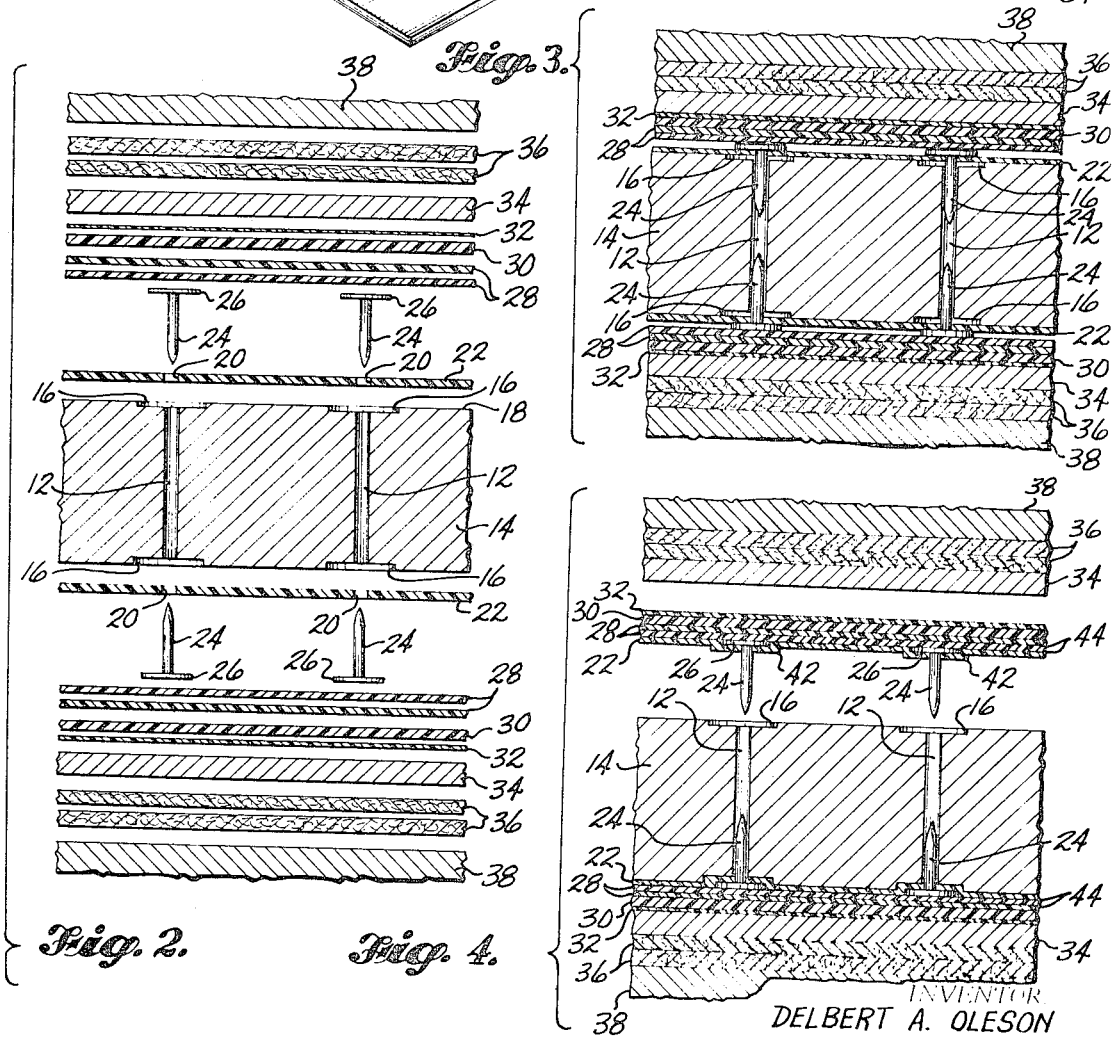

3,546,797
PLASTIC LAMINATE IDENTIFICATION CARD
Delbert A. Oleson, 1215 NE. 94th, Seattle, Wash. 98115
Filed Feb. 8, 1968, Ser. No. 704,142
Int. Cl. A44c 3/00
U.S. Cl. 40—1.5
11 Claims

ABSTRACT OF THE DISCLOSURE

Plastic laminate articles, such as identification badges and the like, of thermoplastic laminate construction fabricated by heating and pressure bonding a thermoplastic body portion of one or more layers of the same color or particularly core and surface layers of contrasting colors to clear thermoplastic anchor sheets between which the heads of fastener pins are embedded. Typically, the pressure bonding occurs in the presence of heat for a period of about two minutes during which period the temperature is progressively increased from 200° F. to about 300° F. and the pressure is increased from about 8 p.s.i.g. to about 12 p.s.i.g.

In one form of construction the laminate comprises rearwardly protruding upset or boss portions, each enclosing and firmly anchoring the head of a fastener pin.

FIELD OF THE INVENTION

This invention relates to plastic laminate articles and more particularly to protruding pin type plastic laminate articles, such as identification badges, and techniques for fabricating same.

DESCRIPTION OF THE PRIOR ART

Identification badges and the like have been manufactured from a variety of materials and generally have been secured to the clothing of the person carrying them by clips, pins, etc., that are secured to the badge by rivets, soldering, adhesive bonding, etc. One such technique is shown in the patent to Harn 3,192,655 wherein metallic pins are soldered to a generally rectangular metal plate and are secured to the clothing by buttons that clamp the stems of the pins. Obviously this type of badge is expensive to fabricate and has limited applications.

Another laminate badge and technique for fabricating same is shown in the patent to Schimmel 3,257,747 wherein plastic sheets are laminated to form the body of the badge. Pins for securing the badge to the clothing are welded to a metal plate which is in turn secured to the badge by plastic protrusions formed when the badge is being laminated. This badge, although an improvement over all-metal badges, is difficult and expensive to fabricate and the metal plate to which the pins are welded is only attached at its edges and ends to the badge and is thus inherently weak and susceptible to loosening or separation.

SUMMARY OF THE INVENTION

Applicant's invention is directed to improved plastic laminate article construction and to a fabricating technique therefor. It is especially related to, but is not limited to, identification badge construction and fabricating techniques therefor whereby the heads of fastener pins are embedded within and firmly anchored to the plastic article as a single operation, without dimpling of the front face of the article and without substantially thickening the article. Basically, the technique employed eliminates the need for separately applied fastener means, such as metal plates, for securing the pins to the plastic. According to the invention, an article is formed complete with fastening pins in a single operation, with the fastening pins being anchored by only the thermoplastic sheets of the article itself. The article, particularly a badge, thus formed is less expensive to manufacture than articles made from known techniques and produces a more smoothly finished surface on both sides without loss of strength in the attachment between the pins and the plastic.

BRIEF DESCRIPTION OF THE DRAWINGS

FIG. 1 is a fragmentary isometric of a portion of laminated article stock embodying the principles of the invention and indicating a line for cutting the stock into individual identification badges or the like.

FIG. 2 is a fragmentary, exploded section of the various thermoplastic sheets arranged in order for laminating and a portion of the apparatus employed.

FIG. 3 is a fragmentary section showing the thermoplastic sheets and laminating apparatus under slight pressure but before plastic flow and bonding take place.

FIG. 4 is a fragmentary section showing the laminated article after the application of heat and pressure and showing the upper article removed from the die.

FIG. 5 is a fragmentary section taken along the line 5—5 of FIG. 1 and showing the upset surrounding the head of a pin.

FIG. 6 is a fragmentary section, similar to FIG. 5, showing a modified form of article without upsets or a multiple layer body portion.

DESCRIPTION OF THE PREFERRED EMBODIMENTS

The plastic articles and technique for fabricating same will be best understood by referring to a typical form, namely, an identification badge, but it should be understood that other articles, such as decorative wall panels and the like, may also be made by the same technique. Turning to a more detailed description of the fabricating technique for an article, such as the badge shown in FIG. 1 by heat and pressure lamination of the sheet assemblage, the makeup therefor first involves drilling holes 12 in an aluminum die 14 and countersinking the holes on opposite sides of the die as at 16. Preferably, the sheets making up the badge stock are applied to opposite sides of the die so that two sets of badge stock may be fabricated simultaneously. For the purpose of this description, however, the make-up of only one set of badge stock will be described, it being readily understood that one set or two may be fabricated simultaneously.

The die 14 has a smooth surface 18, which is flat except for countersinks 16, and upon which a thin sheet 22 of polyvinyl chloride acetate or the like is laid. Other thermoplastics, such as cellulose acetate butyrate or rubberized vinyl such as Royalite, marketed by Uniroyal, Inc., are also suitable and may be used in lieu of polyvinyl chloride acetate, for example. Perforations 20 are formed in a predetermined pattern in sheet 22, by punching or other suitable means. The sheet 22 is hereinafter referred to as a perforated anchor sheet to distinguish it from other anchor sheets later described and in a typical example the sheet is twelve inches wide, eighteen inches long (as are all other sheets) and has a total of seventy spaced holes in ten evenly spaced rows. Although various plastic materials may be used for the anchor sheets, the preferred material is clear unplasticized polyvinyl chloride acetate copolymer (PVCA, rigid), such as marketed by the Bakelite Corporation. The thickness of the perforated anchor sheet 22 is preferably about .015 inch which corresponds with the depth of the countersink 16 which is also about .015 inch.

The next step in the fabrication technique is to insert a plurality of fastener pins 24 having enlarged heads 26 through the perforations 20 and into the countersunk holes 16 as shown in FIG. 3, for example. The stems of the pins are of diameters smaller than the countersunk holes of the die to permit plastic flow around the stems into the countersunk holes. Two additional unperforated anchor sheets 28, preferably also of clear polyvinyl chloride acetate or the like, are laid over the heads of the pins and over the exposed surface of the perforated anchor sheet 22.

Next a body portion of a plurality of sheets is laid over the exposed side of the upper anchor sheet 28. In the preferred embodiment these sheets are of contrasting colors, although they may be of the same color, and include an opaque thermoplastic core sheet 30, also suitably of polyvinyl chloride acetate or the like. The thickness of the core sheet is preferably about .020 inch and its color may be light, such as white, or dark, such as red or brown, for example.

Laid against the exposed side of the core sheet 30 is an opaque, thermoplastic surface sheet 32, also suitably polyvinyl chloride acetate or the like, of a color contrasting with the color of the core sheet 30. For example, if the core sheet is white the surface sheet should be dark red or brown or the like since one marking technique is to cut through the surface sheet to expose the contrasting color of the core sheet. The surface sheet is preferably from .005 to .010 inch in thickness.

The sheets 30 and 32 make up the body portion and with the anchor sheets 22 and 28 make up the plies of the laminated badge. As is well-known per se, the integrally laminated badge is formed by heat and pressure. For this purpose a stainless steel plate 34 of about .032 inch thickness is laid against the exposed side of the surface sheet 32. The plate has a polished, satin, or other desired finish, in a manner known per se. Laid against the exposed side of the metal plate 34 are resilient sheets such as blotters 36 each about .020 inch thick, for example, which serve as padding during the pressurization of the assembly.

Heated platen 38 is lowered against the exposed side of the upper blotter 36 and is connected to a suitable source of power of mechanical loading, such as a screw jack, for pressing the sheets against the die 14. The platen 38 is preferably heated by steam circulated through internal piping, not shown, of sufficient temperature to raise the temperature of the sheets above 300° F. The platen 38 is preferably cooled by circulated tap water at the end of the laminating cycle. The pressure loading on the platen 38 must be sufficient to apply a loading of up to about 15 p.s.i.g.

After the sheets are assembled as above described, the platen 38 is lowered to compress the sheets into the form shown in FIG. 3. Typically, the laminating process takes place preferably over a 2-minute period with the platen initially heated to a temperature of about 200° F. and applying a pressure of approximately 8 p.s.i.g. During the 2-minute interval the temperature is progressively increased to about 300° F. while the pressure is simultaneously progressively increased to about 12 p.s.i.g. During the laminating process the sheets are bonded together, in a manner well-known in the art, and the perforated anchor sheet 22 is heated sufficiently to cause plastic flow into the countersinks 16 forming an upset or boss 42 (FIG. 5) about each pin head. The plastic may also flow into the countersunk holes around the stems of the pins so that air bubbles are released to assure tight anchoring of the pin heads. When cooled, each upset is approximately the thickness of the countersink, i.e. about .015 inch. This covering is extremely strong and retains the pin quite firmly. Such upsets have been shown by test to withstand over 75 pounds axial pull before fracture, with fracture often occurring at the pin base rather than in the plastic.

FIG. 4 shows the badge stock at the end of the laminating process. As is shown also in FIG. 5 the heat and pressure tend to cause a limited flow between the various anchor sheets 22 and 28. However, plies or layers corresponding to the original sheets 22 and 28 are still discernible. The laminated sheets at the end of the laminating process are thus formed as a unitary assemblage identified as badge stock BS with a completely smooth front surface and a substantially uniform thickness, exclusive of the upsets, of about .060–.070 inch. Although the preferred badge stock is relatively rigid, more flexible badge stock may be obtained by using flexible thermoplastic sheets for some of the plies.

A modified form of badge stock is shown in FIG. 6. This form is essentially the same as the preferred form described above with the exception that it is laminated without upsets and the body portion is of a single layer, such as a core sheet. Formation without upsets can be accomplished in several ways, for example, one of which is to punch small holes in the anchor sheet 50 just large enough to accommodate the stems of the pins and then punch larger holes in the center anchor sheet 52 just large enough to accommodate the heads of the pins. Although two anchor sheets are shown, it should be noted that three sheets may be used as in the preferred embodiment. To maintain overall thickness when only two anchor sheets are used, the core sheet 54 is made thicker. In the modification the core sheet has an exposed front surface which may be decorated, printed on, or otherwise marked. Of course, a separate surface sheet may also be used as in the preferred embodiment. In the modified embodiment, the die employed would not need countersinks. When laminated the heads of the pins are embedded between the anchor sheets and the exposed surface of the anchor sheet 50 is planar throughout.

After the badge stock BS of any of the above forms has been suitably cooled, it is trimmed and cut, as indicated by the cut line in FIG. 1, into desired shapes to form badges B, each with two end-placed fastener pins. As was earlier mentioned, the badge is now ready for engraving, as by cutting through the surface sheet to reveal the contrasting core sheet, or marking by any other suitable means. The badge is secured by inserting the pins 24 through the fabric, if the badge is worn on the clothing, and is clamped by a suitable conventional clip or button 46. Thus the finished badge consists of layers of thermoplastic material starting with transparent anchor layers forming upsets around the heads of the pins in the case of the preferred form or an even surface in the modified form, a body portion either of a core layer of a desired color and a smooth surface layer of a color contrasting with the core layer or a body portion of a single layer, such as a thick core layer. The badge is lightweight and of "clean form," yet is quite strong and durable from the point of view of the attached fastener pins.

While the preferred fabricating technique and the finished article forms, particularly badge forms, have been described various further modifications, adaptations and applications thereof such as decorative wall panels and the like will occur to those skilled in the art, within the scope of the following claims.

What is claimed is:

1. A thermoplastically laminated sheet article with embedded pin type fastener means extending from one side thereof for mechanical attachment of the article to a support means by penetration of the pins into the support means, said article comprising:
   (a) a thermoplastic body portion having an exposed front surface on one side thereof;
   (b) a thermoplastic anchor layer bonded to the opposite side of said body portion; and
   (c) a plurality of headed pins embedded between said body portion and said anchor layer with the heads being enclosed by said anchor layer.

2. The article defined by claim 1, wherein said heads of said pins are covered by upset portions of said anchor layer.

3. The article defined by claim 2, wherein said anchor layer is formed of three plies, one of which is perforated.

4. The article defined by claim 2, wherein said thermoplastic layers consist of plies of polyvinyl chloride acetate.

5. The article defined by claim 2, wherein said body portion includes core and surface layers of contrasting colors.

6. The article defined by claim 3, wherein said layers are bonded together to form a unitary assembly being of substantially uniform thickness except for the upsets around the pin heads.

7. The article defined by claim 6, wherein said substantially uniform thickness is between .060–.070 inch.

8. The article defined by claim 7, wherein said upset length is about .015 inch.

9. The article defined by claim 1, wherein said article is an identification badge.

10. The article defined by claim 7, wherein said article is an identification badge.

11. The article defined by claim 7, wherein said body portion includes core and surface layers of contrasting colors and all of said layers are of polyvinyl chloride acetate.

References Cited

UNITED STATES PATENTS

| | | | |
|---|---|---|---|
| 2,902,782 | 9/1959 | Coleman | 40—1.5 |
| 3,257,747 | 6/1966 | Schimmel | 40—1.5 |

EUGENE R. CAPOZIO, Primary Examiner

W. J. CONTRERAS, Assistant Examiner

U.S. Cl. X.R.

40—135